United States Patent [19]

Sjöblom

[11] 4,131,394

[45] Dec. 26, 1978

[54] METHOD FOR TRANSPORT OF MANURE AND A DEVICE ACCORDING TO THE METHOD

[76] Inventor: Bror A. Sjöblom, Gottne, Moliden, Sweden, S-890 26

[21] Appl. No.: 787,499

[22] Filed: Apr. 13, 1977

Related U.S. Application Data

[63] Continuation of Ser. No. 631,125, Nov. 11, 1975, abandoned.

[30] Foreign Application Priority Data

Jan. 23, 1976 [SE] Sweden .............................. 7414262

[51] Int. Cl.² .................. F04C 21/00; F04B 15/02
[52] U.S. Cl. ................................ 417/481; 417/532; 417/900; 222/362
[58] Field of Search ............. 417/481, 482, 900, 519, 417/516, 532; 222/218, 362

[56] References Cited

U.S. PATENT DOCUMENTS

| | | | |
|---|---|---|---|
| 526,127 | 9/1894 | Geiger | 417/532 X |
| 3,667,653 | 6/1972 | Loewenthal | 417/481 X |
| 3,807,908 | 4/1974 | Rossi | 417/481 |

FOREIGN PATENT DOCUMENTS

252997  6/1926  United Kingdom ..................... 417/481

Primary Examiner—Carlton R. Croyle
Assistant Examiner—R. E. Gluck
Attorney, Agent, or Firm—Burns, Doane, Swecker & Mathis

[57] ABSTRACT

A method and a device for transport of manure under pressure through a pipe, including a mainly cylindrical housing with a piston member having a circle segment cross-section, said piston member being arranged to perform a rotary reciprocal movement in forward and reverse direction and to move manure from an inlet to an outlet communicating with a transport pipe, both sides of the piston member acting as pressure surfaces and utilized alternately depending on direction of rotation, said pressure surfaces interworking with a disc shaped valve member extending tangentially from the axis of rotation, arranged to perform a pendular movement and alternately take up contact with one of two opposed edge portions in the outlet.

4 Claims, 5 Drawing Figures

U.S. Patent
Dec. 26, 1978
4,131,394
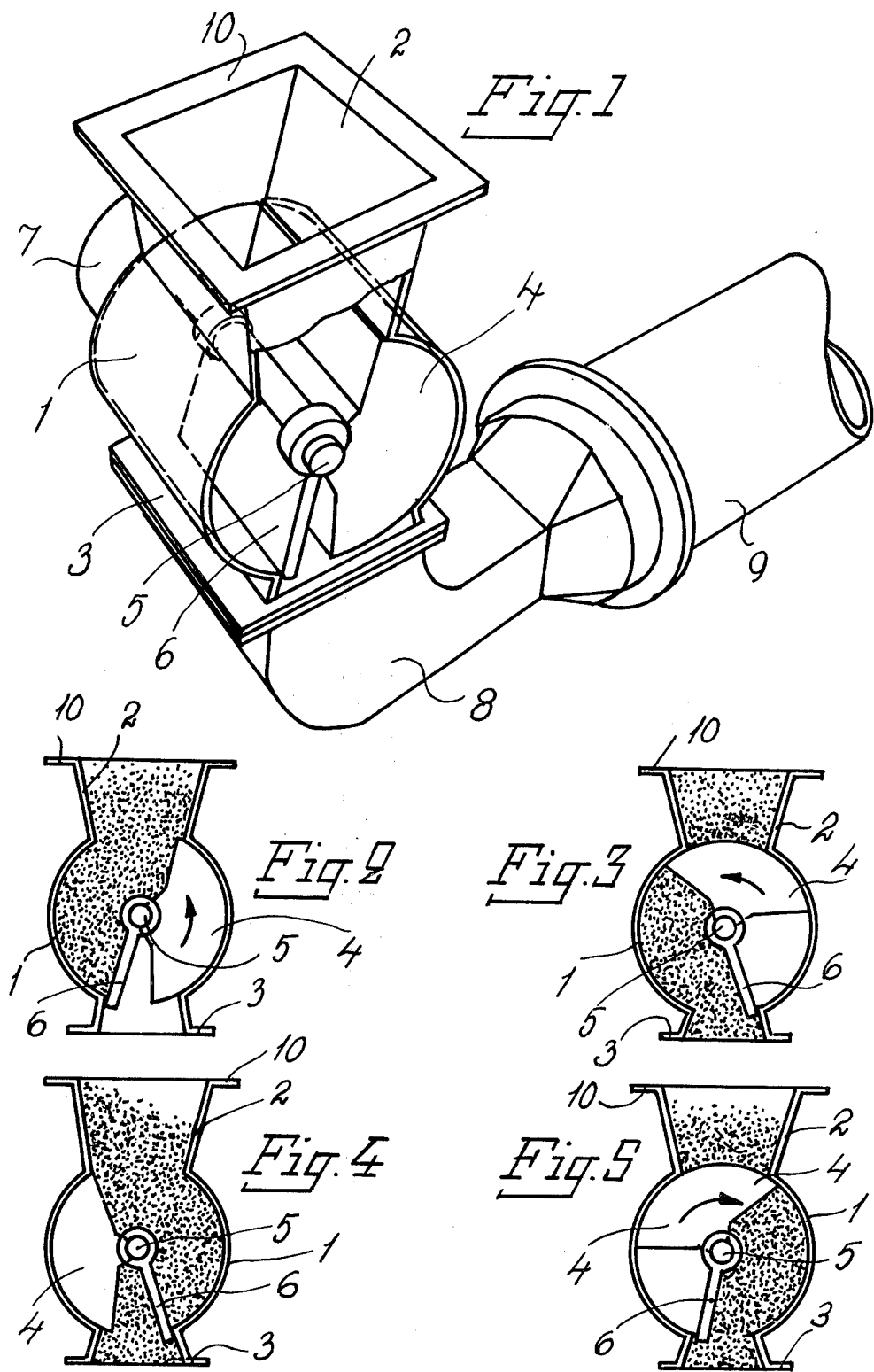

METHOD FOR TRANSPORT OF MANURE AND A DEVICE ACCORDING TO THE METHOD

This is a continuation, of Application Ser. No. 631,125, filed Nov. 11, 1975, now abandoned.

BACKGROUND AND OBJECTS

The present invention relates to a method for transport of manure, and a device according to the method. The method and the device according to the present invention are intended to be utilized in connection with transport of manure under pressure from cowsheds, stables or similar buildings.

It is previously known in buildings as set forth above to move all manure to a predetermined point where a piston member is arranged to move linearly and press the manure down into a transport pipe communicating with a storage area. Hydraulic cylinders or electrical motors have previously been preferred as driving means for the piston member. Electric motors have been preferably used in connection with various types of mechanical transmission systems in order to achieve the desired linear movement of the piston member.

A considerable disadvantage with previously known devices for transport of manure under pressure is the fact that the piston member only is utilized as a pressure member during the movement directed towards the outlet pipe. As a consequence the force necessary during the downwardly directed pressure acting movement of the piston member determines the design of the driving means but the effect of the driving means is only utilized to a minor extent during the return movement of the piston member. In order to avoid the possibility of manure gathering on the non-pressure acting surface of the piston member, it has also been necessary to employ an elongated piston member preferably having a tubular shape. A further disadvantage with regard to previously known types of devices for transport of manure under pressure is that these devices occupy a large space and volume.

The present invention has as its object a method for transport of manure under pressure, and a device for utilizing the method, both intended to eliminate the aforementioned disadvantages and other disadvantages associated with previously known devices. The device according to the present invention allows for a high coefficient of efficiency, an effective utilization of the power source and a design having extremely small dimensions. Furthermore, service and installation can be accomplished with a minimum of labour and time.

SUMMARY OF PREFERRED EMBODIMENT

According to method aspects of the present invention manure is pressed out from an inlet member to an outlet pipe by means of a piston member. The piston member alternately utilizes two separately arranged pressure acting surfaces in connection with a reciprocal rotary movement.

A further characteristic feature for the method according to the present invention is that the outlet pipe is arranged to alternately communicate with the two pressure acting surfaces of the piston member.

Manure is introduced into a generally upwardly facing peripheral inlet opening of a housing and the contents of the housing are discharged under pressure through a generally downwardly facing outlet opening. This discharge is accomplished by alternately rotating the piston in opposite angular directions to advance alternate driving and trailing surfaces past the inlet opening, and resisting passage of the pressurized housing contents into a zone behind the trailing surface. This resistance is established with a pivotable valve that is movable in response to rotation of the piston into alternate blocking contact with the housing at opposed housing junctures with the outlet opening.

The device according to the present invention includes a mainly cylindrical housing, in which a piston member is arranged to perform a reciprocal rotary movement. An inlet and an outlet to said housing are arranged in generally opposed relationship to each other. A valve member is arranged to create alternate communication between the outlet and one of the two parts of the housing disposed at each side of the piston member, depending on the direction of rotation for said piston member. In cross-section, the piston member is shaped like a segment of a circle.

The piston member is arranged in a fixed relationship to an axle, that is situated centrally in relation to the housing and preferably extends through the side walls of the housing. The axle is connected to a driving source located adjacent to the housing. This driving source is operable to alternately create forward, and reverse rotary movements of the axle.

The method according to the present invention and an embodiment of a device utilizing the method will be described below, with reference to the figures shown in the accompanying drawing.

THE DRAWINGS

FIG. 1 is a perspective view, partially broken away of an apparatus for transporting manure under pressure according to the present invention;

FIG. 2 is a cross-sectional view schematically depicting the device shown in FIG. 1 in a first feeding position, FIG. 3 is a view corresponding to FIG. 2, but schematically showing the device in a first ejecting operation;

FIG. 4 is a view corresponding to FIGS. 2 and 3, showing the device in a second feeding position; and FIG. 5 is a view corresponding to FIGS. 2–4, showing the device in a second ejecting operation.

In the figures, a cylindrical housing is indicated with reference numeral 1. The housing is open in an upward direction and is joined with an inlet member 2. The housing also opens downwardly at a location where it is joined with an outlet member 3. The inlet and outlet openings as shown in FIG. 2 are separated by a peripheral distance which extends from an inside edge of the inlet member 2 to an inside edge of the outlet member 3. A sector shaped piston means 4 is fixed to an axle 5, that extends centrally through the housing 1. A disc shaped valve member 6 is pivotably attached to the axle 5. The valve member 6 is dimensioned relative to the inside radius of the housing 1 so that it projects radially from the housing 1 through the outlet opening at the outlet member 3. A driving source 7 is operable forward and reverse rotary motion of the axle 5, along with the attached piston member 4. As may be seen in the drawings, the piston member 4 includes first and second driving surfaces which are separated from each other by a peripheral distance. From FIGS. 2 and 4 it will be appreciated that the peripheral distance between the driving surfaces, when greater than the peripheral distance between the inlet member 2 and the outlet member 3, necessarily reduces the amount of manure which can fill the housing behind the piston and which may be forced back through the inlet by the piston in a reverse stroke. The driving source 7 is disposed adjacent to one of the housing lead through points for the axle 5 as illustrated in FIG. 1 an angular outlet member 8 attached to a partly shown tubular outlet pipe 9 communicates with the outlet member 3.

The illustrated embodiment of a device according to the present invention is able to be positioned relative to a manure path in a stable or cowshed. By providing the illustrated inlet member 2 with an outwardly directed flange member 10, the complete device can with advantage be mounted below the bottom surface of the manure path, preferably with the upper surface of the flange member 10 disposed in a plane corresponding to the bottom plane of the manure path.

Feeding of manure to and into the inlet member can be accomplished according to previously known methods, such as by means of rake conveyors with a reciprocal movement in the manure path. Other methods can of course be used.

By actuating the driving source 7, the piston member 4 is forced to rotate in the housing 1 from the position shown in FIG. 2. When the piston member 4 has moved to the position shown in FIG. 3 the manure on the pressure acting side of the piston member 4 has been compressed and the inlet opening to the housing 1 at the inlet member 2 has been closed. The piston member 4 can now act with maximum pressure against the manure within the housing 1. As soon as the piston member 4 starts its rotary movement, the pressure from the manure within the housing causes the disc shaped valve member 6 to swing in a pendular movement from the position shown in FIG. 2 to the position shown in FIG. 3. The valve member 6 takes up a sealing contact with a side portion of the outlet opening in the housing 1, and manure is pressed against the surface of the valve member 6 which faces the pressure acting surface of the piston member 4. Due to the decrease in volume which is created between the piston member 4 and the valve member 6 during the movement of the piston member 4 to the position shown in FIG. 4, the manure previously fed into the housing 1 is ejected under pressure.

As shown in FIG. 4, more manure is fed into the housing 1 when the piston member 4 has performed the above described first pressure acting movement. The driving source 7 is now actuated to rotate the piston member 4 in the opposed direction, whereby the opposed surface of the piston member 4 now acts as a pressure acting surface. The disc shaped valve member 6 now performs a pendular movement to a contact position against the opposed side portion of the outlet opening, as shown in FIG. 5. When the piston member 4 reaches the position shown in FIG. 2, the driving source 7 is reversed again, thus repeating the operation as previously described.

It is obvious from the above description, that the described device has an extremely high capacity, since the piston member 4 is of a double-acting type. Also the outside dimensions are considerably less than previously known types of devices for transport of manure under pressure. The disc shaped valve 6 serves as a surface against which manure enclosed within the housing 1 is pressed out through the outlet member 3, as well as a protective member preventing a reverse flow from the outlet pipe 8,9 caused by suction. Resuction protection members previously necessary in connection with prior types of devices for transport of manure under pressure are thus unnecessary.

All known driving sources, (e.g. hydraulic cylinders with rotary movement, electrical motors, hydraulic cylinders with mechanical transmission systems and any other driving source arranged to accomplish a reciprocal rotary movement can be utilized as the driving source 7.)

The disc shaped valve member 6 can also be arranged with a guided movement in order to increase the dependability of the device. For example, a resilient member such as a blade spring having two separate legs extending tangentially from the axle 5 can be arranged on each side of the piston member 4.

With reference to the described and shown embodiment, the inlet and outlet members 2, 3 are arranged with a central axis corresponding to a vertical line through the center of the axle 5, but these members 2, 3 can obviously also be disposed in a different orientation to the vertical line.

The embodiment shown and described only serves as an example of a suitable embodiment according to the present invention, since many other embodiments are possible within the scope of the invention and the following claims.

What is claimed is:

1. An apparatus for transporting manure under pressure comprising:
   a generally cylindrical housing presenting a generally upwardly facing peripheral inlet opening and a generally downwardly facing peripheral outlet opening said inlet and outlet openings being separated by a first peripheral distance;
   elongate, rotatable piston means disposed in said housing and presenting first and second generally radially extending driving surfaces connected by a partially generally cylindrical surface having a peripheral extent sufficient to block said inlet opening, said first and second driving surfaces being separated by a second peripheral distance greater than the first peripheral distance between said inlet and outlet openings;
   drive means for rotating said piston means in both angular directions about a generally central axis of said housing; and
   elongate, movable valve means, mounted in said housing for pivotal movement about said generally central axis of said housing to project solely generally radially downwardly from said generally central axis into said outlet opening, and movable between first and second circumferentially spaced positions engaging said housing at opposed junctures with said outlet opening, said valve means cooperating with the driving surfaces of the piston means to urge the manure downwardly through the outlet opening with the driving surfaces of the piston means coming into close proximity with the valve means when the piston is at its lowermost travel about the central axis.

2. An apparatus according to claim 1, wherein: said piston has a cross-sectional configuration corresponding generally to a segment of a circle.

3. An apparatus according to claim 2, wherein: said drive means includes a rotatable generally central axle mounted in said housing; and said piston means is mounted on said central axle for rotation therewith.

4. An apparatus according to claim 3, wherein: said valve means is mounted for pivotal movement on said axle.

* * * * *